US012142252B2

(12) United States Patent
Hesketh

(10) Patent No.: US 12,142,252 B2
(45) Date of Patent: Nov. 12, 2024

(54) MODULAR PICKUP APPARATUS

(71) Applicant: David Hesketh, London (GB)

(72) Inventor: David Hesketh, London (GB)

( * ) Notice: Subject to any disclaimer, the term of this patent is extended or adjusted under 35 U.S.C. 154(b) by 0 days.

(21) Appl. No.: 18/470,355

(22) Filed: Sep. 19, 2023

(65) Prior Publication Data

US 2024/0087551 A1 Mar. 14, 2024

Related U.S. Application Data

(63) Continuation of application No. PCT/EP2023/050349, filed on Jan. 9, 2023.

(30) Foreign Application Priority Data

Jan. 11, 2022 (GB) ..................................... 2200286

(51) Int. Cl.
*G10H 3/18* (2006.01)
*G10D 1/08* (2006.01)

(52) U.S. Cl.
CPC ............. *G10H 3/181* (2013.01); *G10D 1/085* (2013.01)

(58) Field of Classification Search
CPC ............................... G10H 3/181; G10D 1/085
See application file for complete search history.

(56) References Cited

U.S. PATENT DOCUMENTS 2,725,778 A * 12/1955 Cronwell ................ G10D 1/10 84/723
3,763,736 A * 10/1973 Williams .............. G10H 3/181 84/723
3,992,972 A * 11/1976 Rickard ................ G10H 3/181 84/743
5,252,777 A * 10/1993 Allen .................... G10H 3/182 84/743
5,342,989 A * 8/1994 Barcus .................. G10H 3/181 84/723
7,145,063 B2 * 12/2006 Redard .................... G10H 1/32 84/723
7,453,033 B2 * 11/2008 Redard .................. G10H 3/183 84/214
11,195,503 B2 * 12/2021 Bruen .................... G10H 3/183
2006/0054009 A1 * 3/2006 Redard .................. G10H 3/183 84/723

(Continued)

FOREIGN PATENT DOCUMENTS

EP 3098808 A1 11/2016
GB 2614577 A * 7/2023 .......... G10H 1/0091

OTHER PUBLICATIONS

International Search Report for International Application No. PCT/EP2023/050349 of Apr. 3, 2023.

(Continued)

*Primary Examiner* — Robert W Horn
(74) *Attorney, Agent, or Firm* — Perilla Knox & Hildebrandt LLP; Kenneth A. Knox

(57) ABSTRACT

A pickup holder for use with a stringed musical instrument is provided, comprising a housing, comprising a cavity for receiving a pickup device within the housing, engagement means for holding the pickup device in the cavity to form an over-string pickup; and fastening means for attaching the pickup holder to at least one mount, the mount being engageable with the body of the stringed instrument.

20 Claims, 10 Drawing Sheets

(56) References Cited

U.S. PATENT DOCUMENTS

| | | | | |
|---|---|---|---|---|
| 2008/0168884 A1* | 7/2008 | Redard | G10H 3/183 84/329 |
| 2015/0356955 A1* | 12/2015 | Brown, Jr. | G10H 1/32 84/267 |
| 2019/0237047 A1* | 8/2019 | Reddick | G10D 3/12 |

OTHER PUBLICATIONS

Written Opinion for International Application No. PCT/EP2023/050349 of Apr. 3, 2023.

Search Report for GB Patent Application No. 2200286.9 of Jul. 7, 2022.

* cited by examiner

MODULAR PICKUP APPARATUS

CROSS-REFERENCE TO RELATED APPLICATIONS

This application is a bypass continuation of PCT/EP2023/050349 filed Jan. 9, 2023 entitled "MODULAR PICKUP APPARATUS," which claims the benefit of and priority to GB Patent Application No. 2200286.9 filed Jan. 11, 2022, the contents of both of which being incorporated by reference in their entireties herein.

TECHNICAL FIELD

The present disclosure relates to a pickup device, in particular for musical instruments.

BACKGROUND

The "background" description provided is for the purpose of generally presenting the context of the disclosure. Work of the presently named inventor, to the extent it is described in the background section, as well as aspects of the description which may not otherwise qualify as prior art at the time of filing, are neither expressly or impliedly admitted as prior art against the present disclosure.

Users of stringed instruments often need to amplify the acoustic sound of their instruments. There are various ways of translating the vibration of the strings and body of the instrument to an electrical signal including piezo pickups, electro-magnetic pickups, optical pickups and microphones. Pickups that interact with the strings are generally placed underneath the strings (Under-String Pickups) to allow the user full access to the strings. Under-String Pickups are generally permanently or semi-permanently installed on the instrument and do not facilitate rapid or simple detachment. Detachment or replacement can involve the removal of all strings and sometimes also electrical detachment such as unsoldering or unscrewing from terminals.

There are various manufacturers of Under-String Pickups with each different model providing a different output and tone. In order to take advantage of these different outputs and tones within a short space of time (for example during a performance or even during a particular piece of music), users of stringed instruments currently need to own several different instruments with different pickup models installed.

One solution would be to mount the relevant pickup above the strings (Over-String Pickups). Any Over-String Pickup would need to be securely mounted on the instrument. Secure mountings usually require irreversible changes to the structure of the instrument, and understandably, users of stringed instruments are generally reluctant to make any irreversible changes to their instrument. Any mount would also need to take into account the variable topologies of different stringed instruments. In addition, users of instruments generally have strong opinions on any aesthetic changes to the instrument.

U.S. Pat. No. 5,929,362 (US2006054009A1) and U.S. Pat. No. 7,453,033 (US2008168884A1) both disclose a rail system for mounting a pickup.

BRIEF DESCRIPTION OF THE DRAWINGS

Non-limiting embodiments and advantages of the present disclosure are explained with reference to the following detailed description taken in conjunction with the accompanying drawings, wherein.

Like reference numerals designate identical or corresponding parts throughout the drawings.

DETAILED DESCRIPTION

Figure 1:
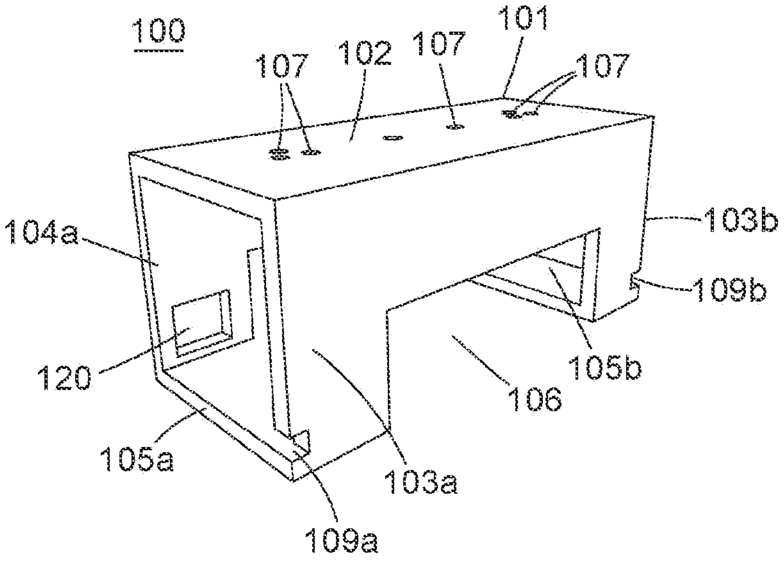
FIG. 1 shows an isometric view (view from above) of a pickup holder.

Various technologies pertaining to an apparatus that provides the user of a stringed instrument with a rapidly detachable, replaceable and portable over-string pickup that does not alter or damage the structure of the string instruments are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Further, as used herein, the term "stringed instrument" is intended to encompass any musical instrument that produces sound from vibrating strings when a performer plays or sounds the strings in some manner. The instrument can include, but is not limited to, a guitar, a bass guitar, a violin, a viola, a cello, a banjo, a mandolin, a ukulele, and/or the like. While the examples set forth herein pertain to a guitar, it is to be understood that the examples are not intended to be limiting.

Disclosed is a rapidly detachable, replaceable and portable pickup holder that is configured to be mounted on integrated or individual mounts that are fitted to a stringed instrument in a way that does not alter or damage the structure of the stringed instrument enabling the pickup holder to be rapidly attached and detached from the stringed instrument. Engagement means (such as tongue-and-groove and/or protrusions on one that fit in holes on the other) are provided to hold the enclosure in a static position with respect to the mount(s).

FIGS. 1-7 show an embodiment of a pickup holder 100 for receiving a pickup 118. The pickup holder comprises a housing 101 that is configured to be detachably mounted to the stringed instrument as will be described below.

FIG. 1 shows an isometric view of pickup holder 100. Pickup holder 100 comprises a housing 101. The pickup holder 100 is formed so as to define a cavity 106 within the housing 101. The housing 101 comprises a transverse web 102 and a first and second leg. The first and second legs are formed of respective first and second portions 103*a* and 104*a*, 103*b* and 104*b*. The transverse web 102 comprises a longitudinal plate having a first end and second end. The first leg is at the first end and the second leg is at the second end. A first portion 103*a* of the first leg extends from a corner region of the first end of the transverse web 102, and a second portion of the first leg extends from a second corner region of the first end of the transverse web 102. The first and second portions of the first leg, 103*a*, 104*a* are connected by a foot plate 105*a*. The first end of the longitudinal transverse web 102, the first and second first leg portions 103*a*, 104*a* and the foot plate 105*a* define an aperture on the side of the pickup device 100. Likewise at the opposite end of the longitudinal transverse web 102, the end of the longitudinal transverse web 102 the first and second portions of the second leg 103*b*, 104*b* and the second foot plate 105*b* define an aperture in the pickup device 100. The transverse web 102 may be regarded as the "top" of the pickup holder 100, as it is located furthest from an instrument to which the pickup holder is mounted.

Figure 2:
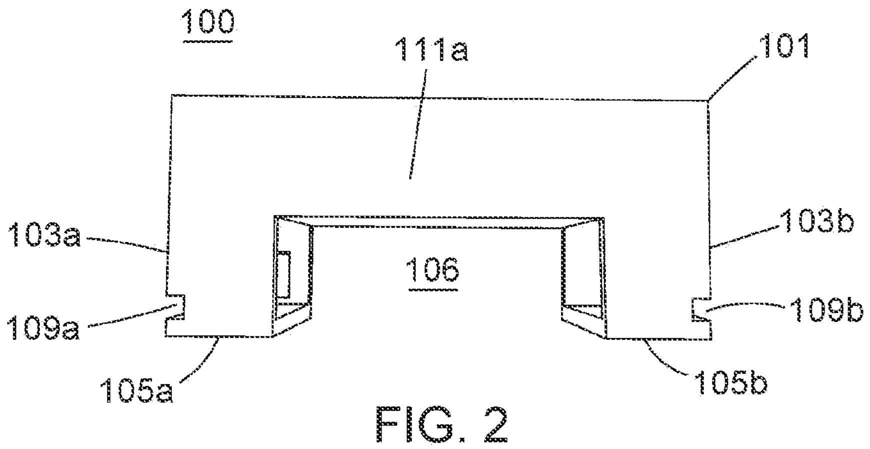
FIG. 2 shows a front view of a pickup holder.

FIG. 2 shows a front view of a pickup holder 100. It can be seen that in the first portion of the first leg 103*a* and the first portion of the second leg 103*b*, apertures 109*a*, 109*b* are formed at an end distal from the transverse web 102. That is, the apertures 109*a*, 109*b* are located towards the base end of the legs, distal from the transverse web. The apertures 109*a*, 109*b* are located on a side of each respective leg that is distal from the other. It will be appreciated that the apertures could, with the necessary modifications made to the mount portions described below, also be formed on the proximal side of each leg. As shown in FIGS. 1-7, the legs may be linked by lateral webs 111*a* and 111*b*, which provide strength to the pickup device, and also protect a pickup device located in the cavity.

Figure 3:
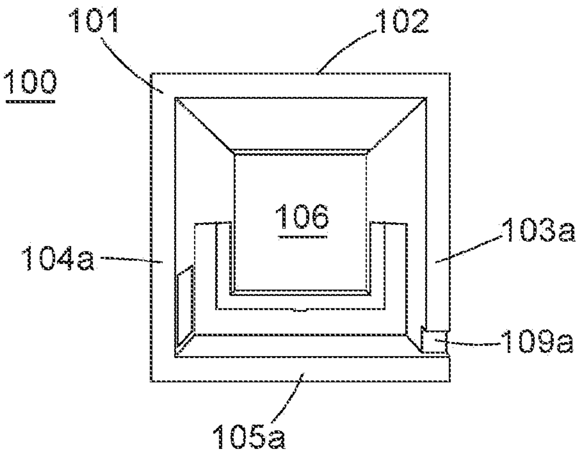
FIG. 3 shows an end view of a pickup holder.
Figure 4:
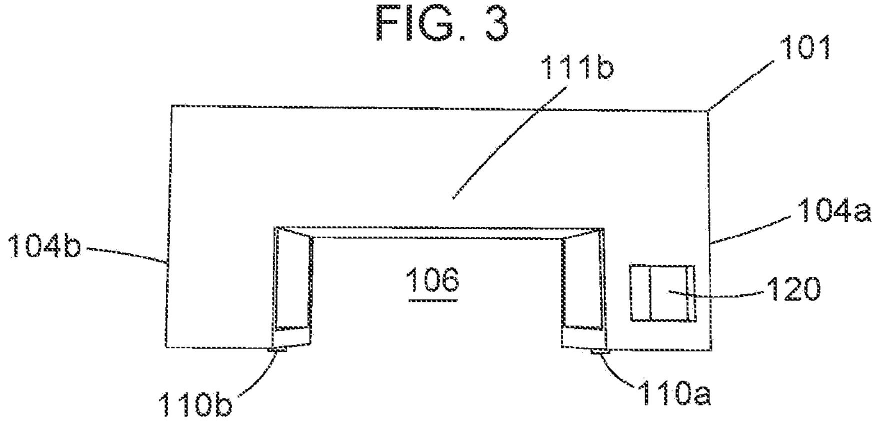
FIG. 4 shows a rear view of a pickup holder.

As can be seen in FIGS. 3 and 4, first portions 103*a*, 103*b* of the first and second legs comprises the apertures 109*a*, 109*b* whereas the second portions 104*a* and 104*b* of the first and second legs do not comprise an aperture.

Figure 5:
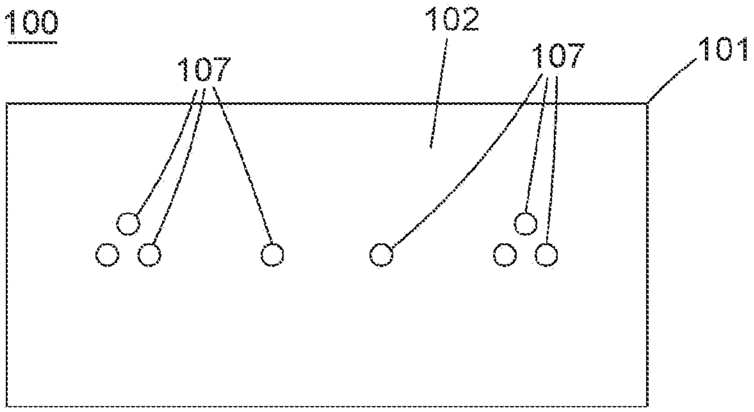
FIG. 5 shows a top view of a pickup holder.

FIG. 5 shows a top view of the pickup holder 100 showing an arrangement of screw apertures 107. The transverse web 102 comprises a plurality of holes 107 which are arranged to allow fastening means (e.g., screws or bolts or similar) to be inserted through the holes to hold a pickup device in position within the cavity 106. A plurality of holes 107 are provided to accommodate a variety of positions for mounting screws, and may be determined by a particular arrangement of mounting screw holes for any given pickup device to be held within the pickup holder 100.

It will be appreciated that a particular arrangement of holes in the transverse web may take any number of different forms depending on the particular standard of pickup device to be used with the pickup holder.

Figure 6:
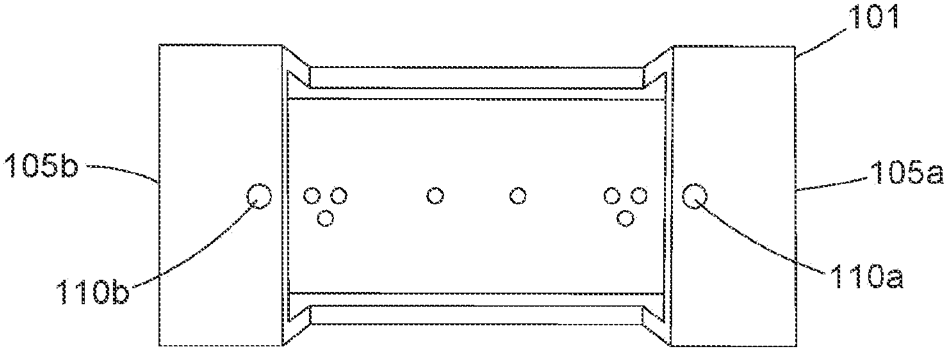
FIG. 6 shows a bottom view of a pickup holder.

FIG. 6 shows a bottom view of the pickup holder 100. A first foot plate 105*a* and the second foot plate 105*b* comprise a respective first protrusion 110*a* and second protrusion 110*b* extending from the bottom of each respective foot plate.

Figure 7:
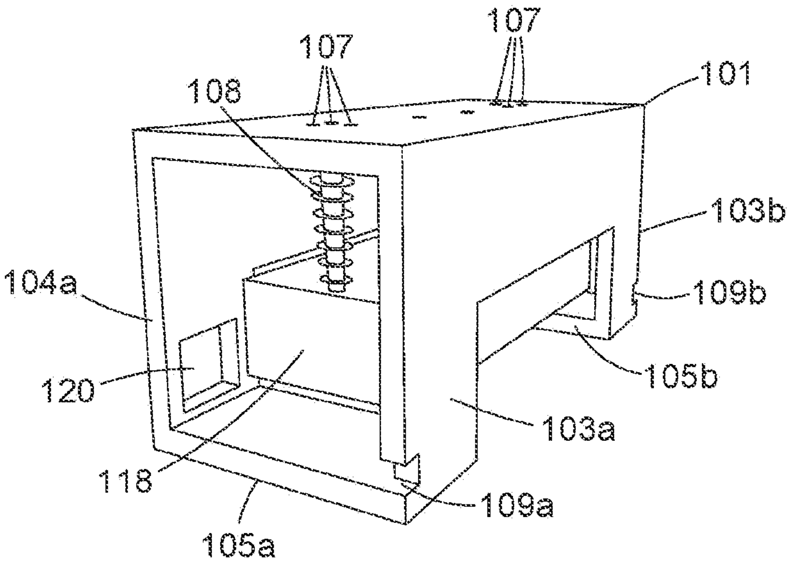
FIG. 7 shows an isometric view (view from above) of a pickup holder with a pickup installed.

FIG. 7 shows an isometric view of the pickup holder 100 with a pickup device 118 installed in a cavity 106. A relevant pickup device 118 may be inserted through the aperture formed in either side of the pickup device 100 and held in position by one or more screws inserted through the screw holes 107 and into corresponding mounting screw holes located on the pickup device 118. The securing screws may be inserted through a mounting spring which provides tension to the pickup device so as to better hold it in place within the cavity 106. It will be appreciated that other resilient bias means, such as resilient inserts or other tensioning devices providing a stabilising biasing force may be used in place of the spring 108. Pickup holder 100, the housing 101 and the first and second legs are made of a size such that the first and second legs may straddle the strings of a stringed instrument upon which the pickup holder is to be placed or mounted. The legs are of a length such that the strings may pass through the cavity 106 unimpeded when a pickup device 118 is inserted therein.

A pickup device 118 may be straightforwardly inserted into the cavity 106 and attached to the pickup holder via a screw inserted through the apertures 107. Attaching a pickup device to the pickup holder in this way allows for straightforward adjustment of the height of each end of the pickup with respect to the strings of an instrument over which the pickup holder may be placed.

To adjust the height of each side of the pickup with respect to the height of the strings on the stringed instrument, the user may straightforwardly vary the degree to which the screws are turned. In turn, this allows the user to adjust the output and tone of the relevant pickup in the same way as with a normal under-string installation. However, the user has the advantage of not being required to remove the strings of the instrument.

Figure 8:
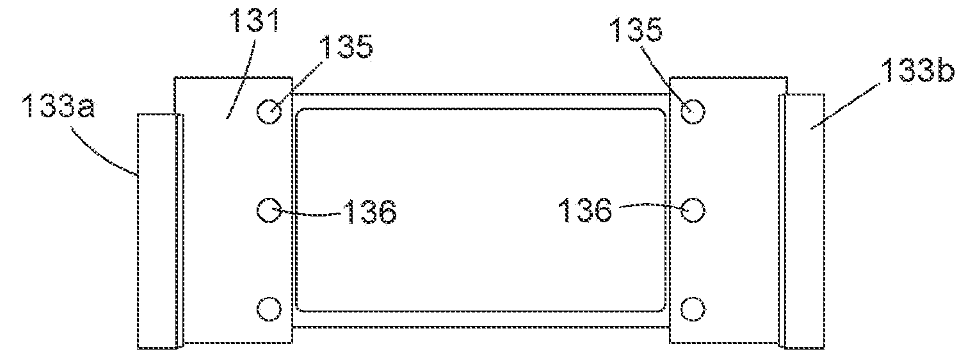
FIG. 8 shows a top view of an integrated pickup ring mount.
Figure 9:
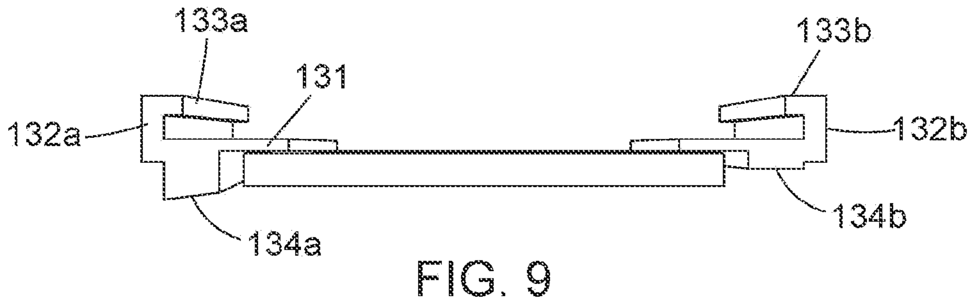
FIG. 9 shows a front view of an integrated pickup ring mount.
Figure 10:
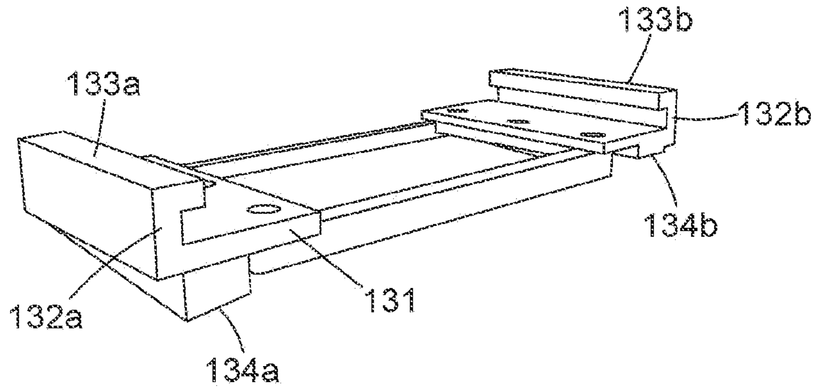
FIG. 10 shows an isometric view (view from above) of an integrated pickup ring mount.
Figure 11:
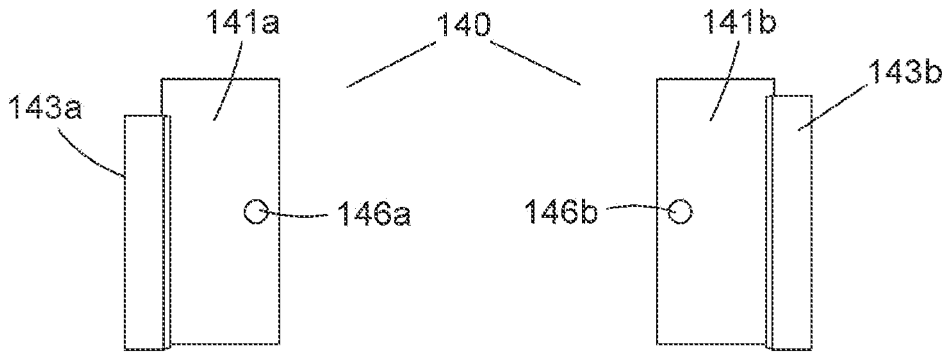
FIG. 11 shows a top view of individual mounts.
Figure 12:
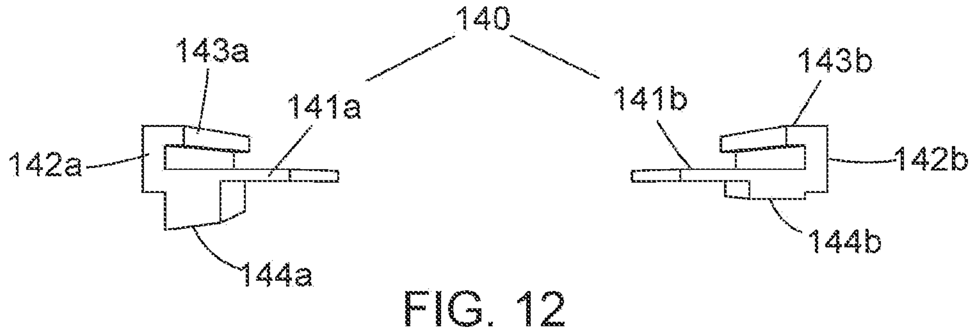
FIG. 12 shows a front view of individual mounts.
Figure 13:
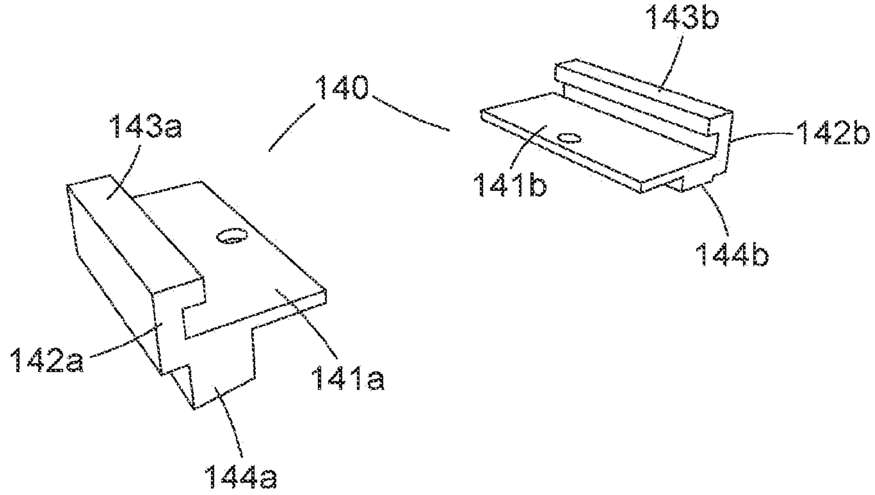
FIG. 13 shows an isometric view (view from above) of individual mounts.

FIGS. 8-13 show embodiments of mounts that may be used with the pickup holder 100. FIGS. 11-13 show embodiments of integrated mounts that may be used with the pickup holder 100, while FIGS. 8-10 show embodiments of individual mounts that may be used with the pickup holder 100.

In a first embodiment (for example as illustrated in FIGS. 8-10 showing mounts incorporated into a single piece, purpose-built pickup ring), the mounts are incorporated into a single piece, purpose-built pickup ring, pickup cover or pickguard affixed to the stringed instrument (e.g. a guitar) using the normal methods of fixing (usually small screws or clips for the pickup ring and pickguard and usually friction for the pickup cover) for such pickup rings, pickup covers or pickguards. These mounts are referred to herein as integrated mounts 130. In a second embodiment (for example as illustrated in FIGS. 11-13), the mounts are individually affixed to the body of the stringed instrument (ego a guitar) either side of the strings using a pressure sensitive adhesive. The pressure sensitive adhesive may be anon-harming, removable physical or chemical adherent such as van der Waals nanotape or tacky suction cups. These mounts are referred to herein as individual mounts 140. Typically, the structure of an integrated mount 130 when excluding the attached pickup ring, pickup cover or pickguard is identical to two individual mounts 140 taken in combination.

Pickup rings usually only comprise a single piece plastic surround that screws directly onto existing screw holes on the relevant stringed instrument. In the case of the present application, the mounts may comprise an integrated mount 130, in which the pickup ring is manufactured with integral mounts, for instance in a single piece of plastic. The integrated mount 130 would then be affixed (usually by standard pickup ring screws) directly onto the existing screw holes on the relevant stringed instrument. In this way, the mounts would already be part of the infrastructure of the guitar and not require any additional physical or chemical adherence. The same method of construction can be used for pickguards and pickup covers so that each comprises a single piece of material that includes the mounts. These may then be affixed using the normal method of attachment for such items onto the stringed instrument (usually screws, clips or friction).

As some users of stringed instruments may not want to switch their existing pickup rings, pickup covers or pickguards (regardless of the fact that these items are detachable and attachable without harming the stringed instruments), embodiments comprising individual mounts allow users of stringed instruments to affix the pickup holder to the stringed instruments using non-harming, removable physical or chemical adherence such as van der Waals nanotape or tacky suction cups. Unlike integrated mounts, individual mounts can be affixed in such way without requiring the strings to be moved out of the way (either by detuning or completely removing or restringing the instrument). As a result, they are easier for users to affix.

As shown in FIGS. 8 to 10, the integrated mount 130 comprises a base plate 131, which may be formed of a unitary piece, or may be formed of two distinct portions to be located either side of the strings of the instrument. The base plate 131 comprises upstanding portions 132*a*, 132*b*, which extend away from the base plate. Each upstanding portion 132*a*, 132*b*, comprises a flange 133*a*, 133*b* which extends perpendicular to the upstanding portion 132*a*, 132*b* so as to form a lip. Extending from the base plate in the opposite direction from the upstanding portions 132*a*, 132*b* are instrument engaging portions 134*a*, 134*b*, which are arranged to be placed against the body of an instrument on which the mount is to be mounted. Where the base plate is formed of two separate portions, as shown in FIGS. 8 to 10, the two separate portions of the base plate 131 may be linked by longitudinal ribs 137 extending between the two lateral portions. Alternately, the two portions of the base plate of the integrated mount may be mounted on a single piece resembling the form of a pickup ring, which may be formed of a single piece of material as described above. The base plate may comprise one or more mounting screw holes 135, and a mount location hole 136. As described above, the mounting screw holes 135 may be used in conjunction with standard screws to fix the integrated mount 130 to the body of an instrument.

The upstanding portions 132*a*, 132*b* and lipped 133*a*, 133*b* shown in FIGS. 8 to 10 extend towards each other. The mount location holes 136 are arranged to receive the protrusions 110 located on the foot plate 105*a* and 105*b* of the first and second leg. When the protrusion 110 is located within the mount location hole 136, that is when the pickup holder 100 is engaged with the mount, the protrusion locates the pickup holder 100 in the desired position once it has been engaged with the mount 130. The engagement of the protrusions 110 and the mount location holes 136 also prevents further lateral movement of the pickup holder 100 and the mount 130 with respect to one another.

The instrument engaging portions 134*a*, 134*b* shown in FIGS. 9 and 10 are angled or otherwise moulded to match the varying topology of as stringed instrument to which it may be applied.

As described above, FIGS. 8-10 show an embodiment of an integrated mount 130 configured to be used with the pickup holder 100. The integrated mount 130 comprises a base plate 131 with an overhanging groove and lip 133 on the top face of the platform along an edge that in use will be furthest from the strings. The mount also comprises a small mount location hole 135 which engages with the protrusion 110 on the pickup holder 100 to locate the pickup holder 100 in the correct position once it has been slid along the groove defined by the flange 133. The small hole 135 receives the protrusion 110 on the feet 105 of the pickup holder 100. The integrated mount 130 shown in FIGS. 8-10 comprises mounts connected by a pickup ring. Other integrated mounts could be manufactured where the mounts are connected to a pickup cover, pickguard or other standard attachment to the relevant stringed instrument.

The integrated mount 130 also comprises an underside, or instrument engaging portion 134 that is either flat, angled or otherwise moulded to match the varying topology of different stringed instruments. The bodies of stringed instruments can variously be sculpted, flat or angled or incorporate fixings such as pickup covers, pickup rings, pickguards, scratchplates, switches and control knobs etc. The bottom of the mount is therefore shaped to suit the relevant stringed instrument. This provides a large surface area of attachment to the body of the stringed instrument which in turn reduces the attachment forces per unit area required to adhere the mount to the body of the string instrument. This, combined with non-harming, removable physical or chemical adherence methods such as van der Waals nanotape or tacky suction cups, prevents any damage being caused to the structure of the stringed instrument.

The integrated mount also comprises standardised attachment structures, including screw holes 135 and clips, on the relevant pickup ring (FIGS. 8-10 show an integrated mount comprising mounts connected by a pickup ring), pickup cover or pickguard that allow the integrated mount to be affixed to the string instrument in the same way as the usual pickup ring, pickup cover or pickguard.

FIGS. 11-13 illustrate embodiments of individual mounts 140. Like the integrated mount 130, the individual mounts

140 each comprise a base plate 131 with an overhanging groove defined by an upstanding portion and a lip 133 on the top face of the platform along an edge that in use will be furthest from the strings. Each individual mount 140 also comprises a small mount location hole 136 which engages with the protrusion 110 on the pickup holder 100 to locate the pickup holder 100 in the correct position once it has been slid along the groove. The small hole 136 receives the protrusion 110 on the feet 105 of the pickup holder 100.

Each individual mount 140 also comprises an underside instrument engaging portion 134 that is either flat, angled or otherwise moulded to match the varying topology of different stringed instruments. The bodies of stringed instruments can variously be sculpted, flat or angled or incorporate fixings such as pickup covers, pickup rings, pickguards, scratchplates, switches and control knobs. The bottom of a mount is therefore shaped to suit the relevant stringed instrument. Typically a pair of individual mounts are used to mount a pickup holder enclosure to a stringed instrument.

Figure 14:
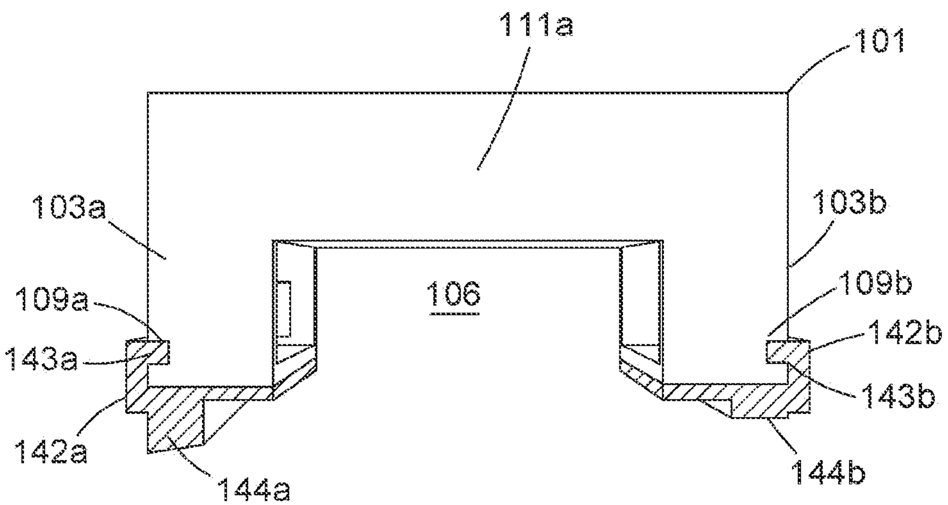
FIG. 14 shows a front view of a pickup holder on individual mounts.
Figure 15:
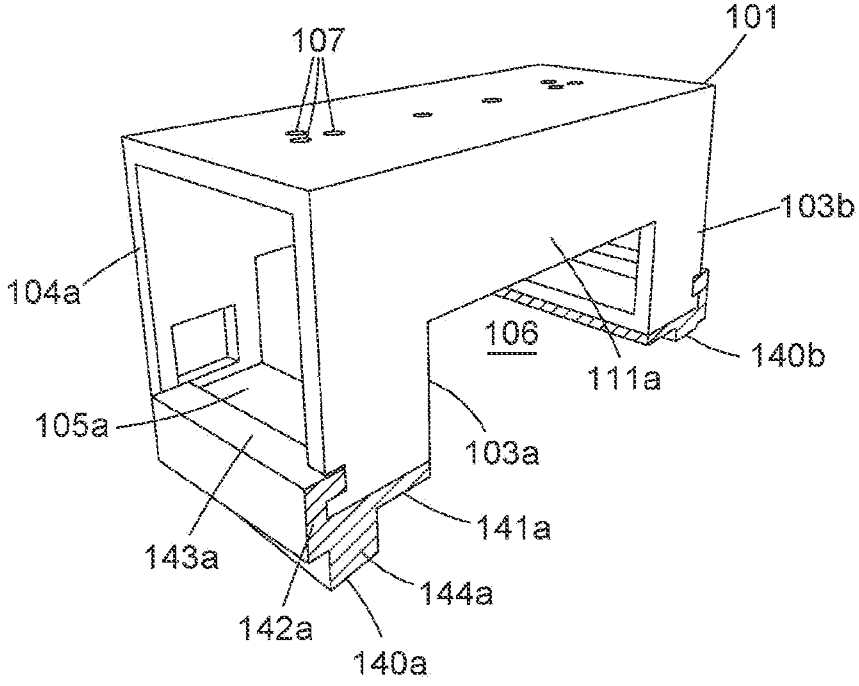
FIG. 15 shows an isometric view (view from above) of a pickup holder on individual mounts.

FIGS. 14 and 15 show a front view and isometric view of a pickup holder 100 as described herein located on a pair of individual mounts 140 as described in relation to FIG. 8-13. As can be seen, the lip 133 of the mount 140 fits within the aperture 109 of the pickup holder 100. The protrusions 110 of the pickup holder 100 engage with the mount location holes in the mounts 140 to hold the pickup holder 100 in position on the mounts 140. Similarly, for integrated mounts 130, the lip(s) 133 of the mount 130 fits within the aperture (s) 109 of the pickup holder 100. The protrusions 110 of the pickup holder 100 engage with the mount location holes in the mount 130 to hold the pickup holder 100 in position on the mounts 140. To arrive at the arrangement shown in FIGS. 14 and 15, the pickup holder is placed such that the one or more apertures 109 are located so as to engage the lip(s) 133 of the mounts 140 and the pickup holder is slid into place such that the lip 133 engages the aperture 109. Since the apertures 109 are only located in one side of the legs, the second portions 104*a*, 104*b* effectively provide a backstop, or limit to the sliding motion, and the end of the lip 133 abuts the inside of the second portions 104*a*, 104*b* to hold the pickup holder 100 in place. It will be appreciated that the aperture may only be provided in either one of the legs, though a more secure attachment is obtained where the apertures 109 are formed in both legs and engage mount portions 130, 140 on both sides of the strings.

The relative dimensions of the apertures 109 and the groove and lip 133 may be such that an interference fit is created between them when the pickup holder is engaged with the mount.

Figure 16:
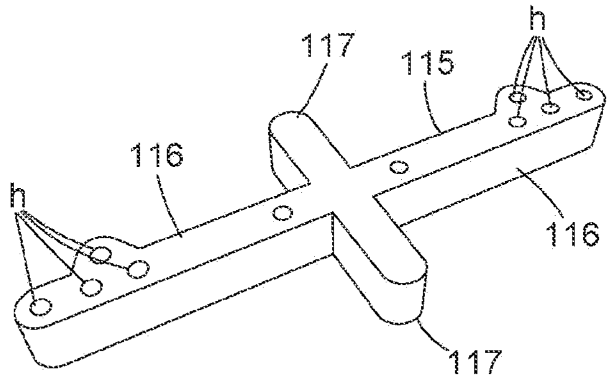
FIG. 16 shows an isometric view of a stabilising bar to be used with a pickup holder according to the present disclosure.

A stabilising bar or adapter may be used within the cavity 106, as can be seen in FIG. 16. The stabilising bar 115 may be arranged to have a series of apertures h so as to mount a pickup 118 thereon, and further standardised apertures to receive one or more adjustment screws through the screw holes 107 in the top of the pickup holder 100. The stabilising bar may be of a cruciform shape, having longitudinal arms 116 and lateral arms 117. The lateral arms 117 have a combined length dimensioned to match the interior of the cavity 106 as defined by the lateral webs 111*a*, 111*b*. The lateral arms may abut the internal side of the lateral webs 111*a*, 111*b*, to thereby provide stabilisation against movement of the pickup 118 with respect to the pickup holder 100.

Figure 17:
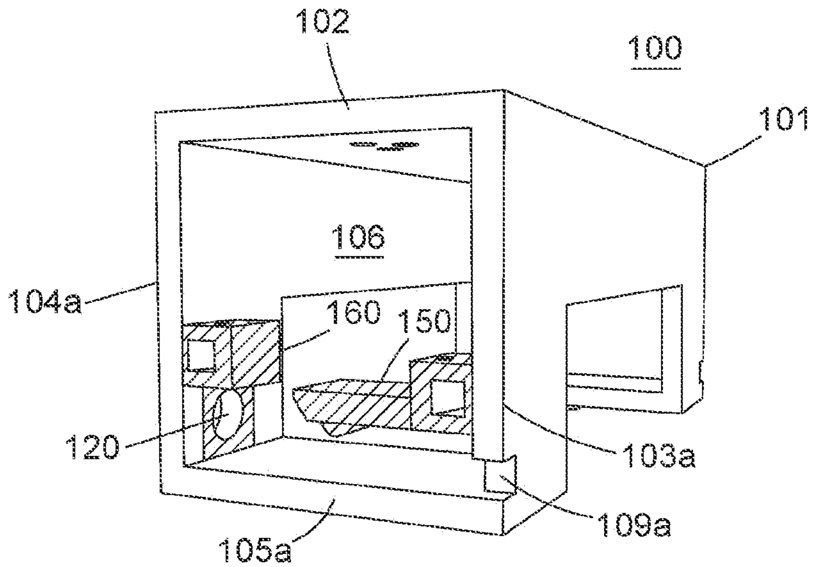
FIG. 17 shows an isometric view of pickup holder comprising an integrated connector socket.
Figure 18:
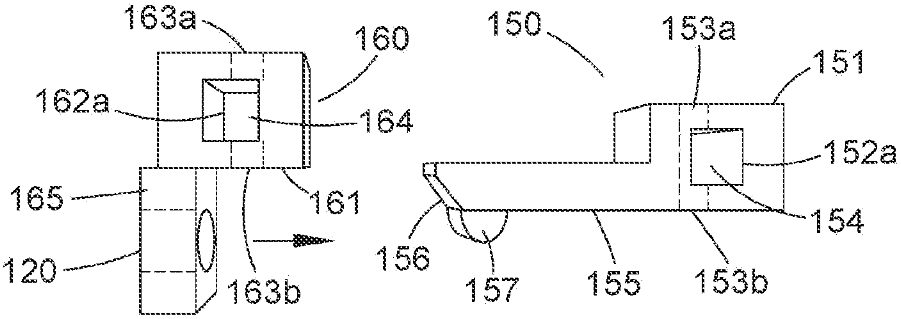
FIG. 18 shows a side view of a connector receiver.
Figure 19:
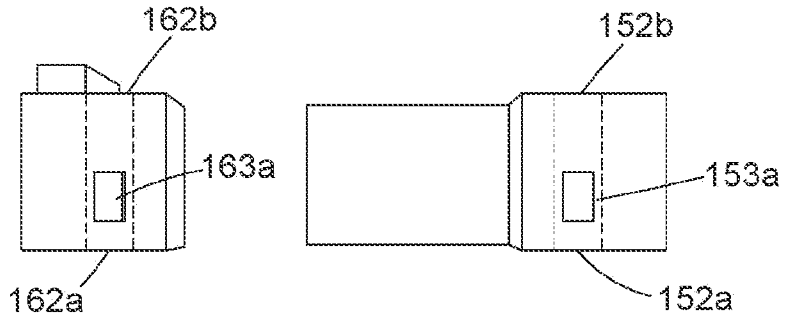
FIG. 19 shows top view of a connector receiver.
Figure 20:
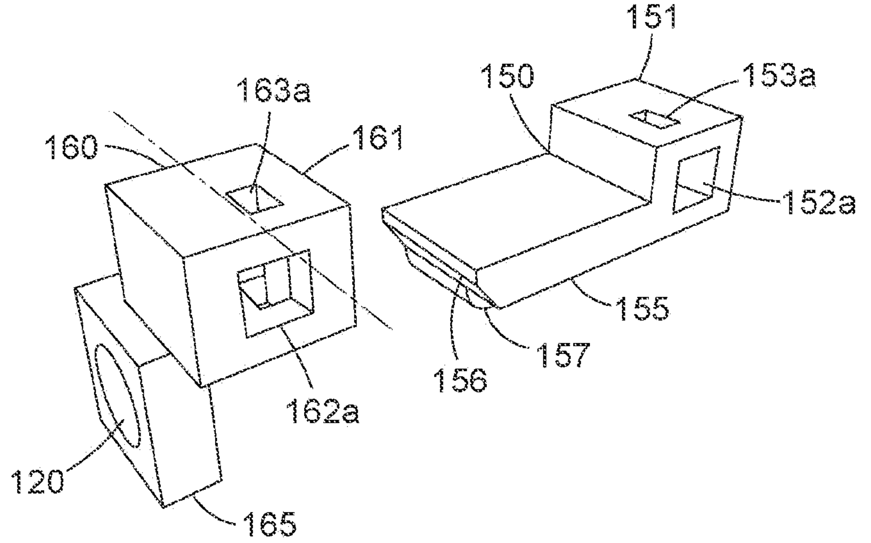
FIG. 20 shows an isometric view (view from above) of a connector receiver.

FIG. 17 shows a pickup holder 100 comprising an integrated jack connection. The second portion 104*b* of the first leg comprises a jack aperture 120. As can be seen in FIGS. 18 to 20, the integrated jack connection comprises a tip connection 150 and a sleeve connection 160 which may be formed of an electrically conductive material. The tip connection 150 comprises an electrical connecting block 151 and a tip engaging bar 155. The electrical connecting block defines a central cavity 154. The central cavity 154 may be accessed via a vertical channel through the electrical connecting block 151 that is defined by and extends between a top aperture 153*a* and a bottom aperture 153*b*. The central cavity 154 is also accessible by a channel that extends laterally through the electrical connecting block 151 between apertures 152*a* and 152*b*. The channel extending between apertures 153*a* and 153*b* is dimensioned so as to receive an electrically conductive wire. The tip connection 150 may be integrated into the first portion 103*a* of the first leg, such that the tip engaging bar 155 extends towards the interior of the cavity within the leg. The tip engaging bar 155 comprises an angled distal end 156. Tip engaging bar 155 also comprises a protrusion 157 which is arranged to engage with the dimensions of a tip of any standard audio connection plug.

Sleeve connection 160 comprises an electrical connecting block 161 which corresponds in construction to the electrical connecting block 151. Electrical connecting block 161 is in contact and therefore electrical connection with sleeve engaging portion 165 in which the jack aperture 120 is located.

When an audio connection plug is inserted into jack aperture 120 and extended towards the tip engaging bar, the tip of the audio connection plug will engage the angled distal end 156 of the tip engaging bar 155 and the tip engaging bar will force the plug to be angled down towards the foot plate 105*a*. When fully inserted, the audio connection plug will be held in place by the jack aperture 120, and the tip engaging bar 155. The plug may be held tightly in place against the base of the pickup holder 100 by the tip engaging bar 155. The tip connection 150 and sleeve connections 160 are formed of an electrically conductive material such that an electrical connection may be formed between the sleeve of the audio connection plug as it touches the walls of the jack aperture 120, and as the tip of the audio connection plug contacts the protrusion located on the tip engaging bar 155.

Figure 21A:
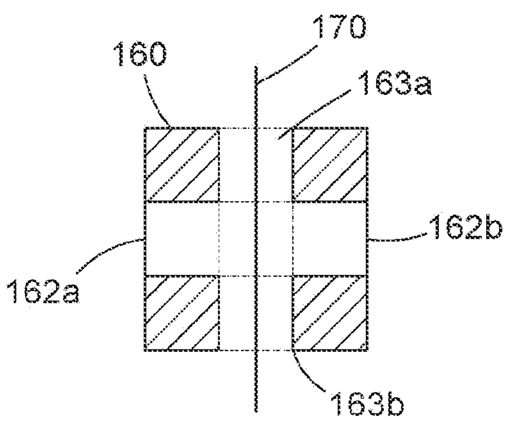
FIGS. 21*a* and 21*b* show a cross section of a wire connection junction for the connector receiver.
Figure 21B:
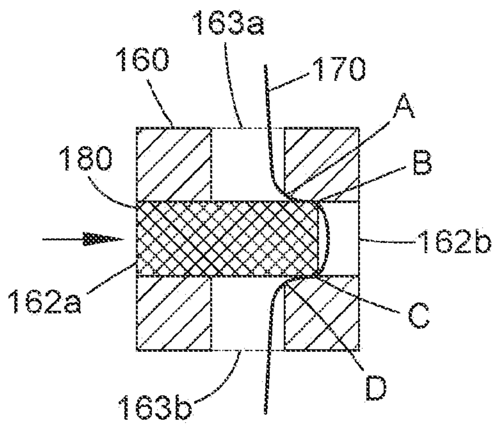

The operation of the electrical connecting blocks 151, 161 will now be described, with reference to FIGS. 21*a* and 21*b*. Reference to electrical block 161 may be considered equivalent to block 151. Electrical connecting block 161 may be formed of an electrically conductive material. An electrically conductive wire 170 may be passed through the channel formed between apertures 163*a* and 163*b*. As described above, the channel located between apertures 163*a* and 163*b* may be dimensioned to closely match the dimensions of an electrically conductive wire to be used with the electrical connecting block 161. The channel between apertures 162*a* and 162*b* is arranged to receive a plug 180. As shown in FIG. 20*b*, a plug 180 may be inserted via aperture 162*a* into the electrical connecting block 151, 161 such that it engages the wire, and an interference fit is formed between the plug 180 and the interior walls of the cavity in the electrical connecting block 151 through the deformation of the wire 170. The plug 180 therefore remains in place through the interference fit of the wire in the cavity. As can be seen in FIG. 20*b*, the wire may contact the electrical connecting block at locations A and D, and may also contact the plug at locations B and C shown in the figure. The plug 180 may also be formed of an electrically conducting material such that where it contacts interior cavity of the electrical connecting block 151 it will thereby form an electrical connection. As such, up to four points of electrical contact may be made between the wire and the electrical connecting block 151, 162, either directly or via the plug 180. The connector block is made of few parts and is easy to manufacture and assemble. The presence of aperture 162*b* allows for the plug 180 to be easily removed by pushing the plug out from the side of the aperture 162*b*. In an alternative arrangement, for a more permanent connection, aperture 162*b* may be not present in the wall of the connector block.

It will be appreciated that the integrated jack connection in FIG. 16 shows only a sleeve and tip connection, and that a further ring engaging bar (not shown) could be used to provide a stereo signal, or to provide two balanced mono signals from a pickup device held in the pickup holder. Other arrangements of switch connection sockets will be apparent to the skilled person.

An electrical connection block is provided, comprising a first interior channel arranged to receive a first electrical wire, and a second interior channel perpendicular to the first interior channel, which intersects the first channel, arranged to receive a plug, such that when the plug is located in the second channel the plug deflects a wire located in the first channel so as to urge the wire against one or more surfaces or edges of the interior of the connection block.

Figure 22:
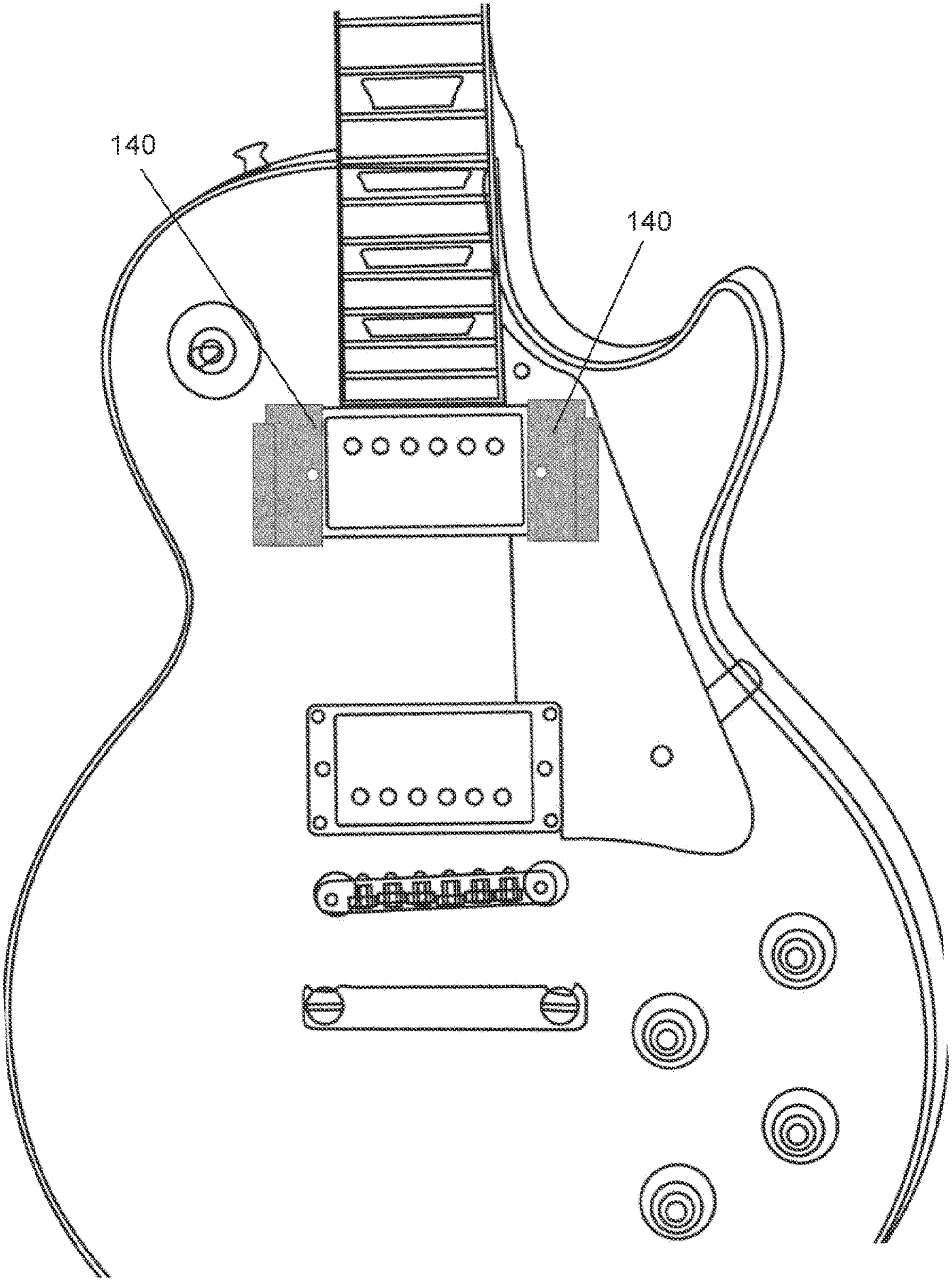
FIG. 22 shows individual pickup mounts installed on a guitar.

FIG. 22 illustrates a top view of individual pickup mounts 140 installed either side of the strings of a stringed instrument, in this case a guitar. Each individual mount 140*a*, 140*b* may be affixed to the guitar using non-harming, removable physical or chemical adherence such as van der Waals nanotape or tacky suction cups.

In the case of an integrated mount 130 comprising mounts connected to a pickup ring (FIGS. 8-10 show an integrated mount comprising mounts connected by a pickup ring), pickup cover or pickguard, the integrated mounts would then be affixed to the instrument using the normal methods of fixing for such pickup rings, pickup covers or pickguards (for example small screws or clips for a pickup ring or pickguard and usually friction for the pickup cover).

Figure 23:
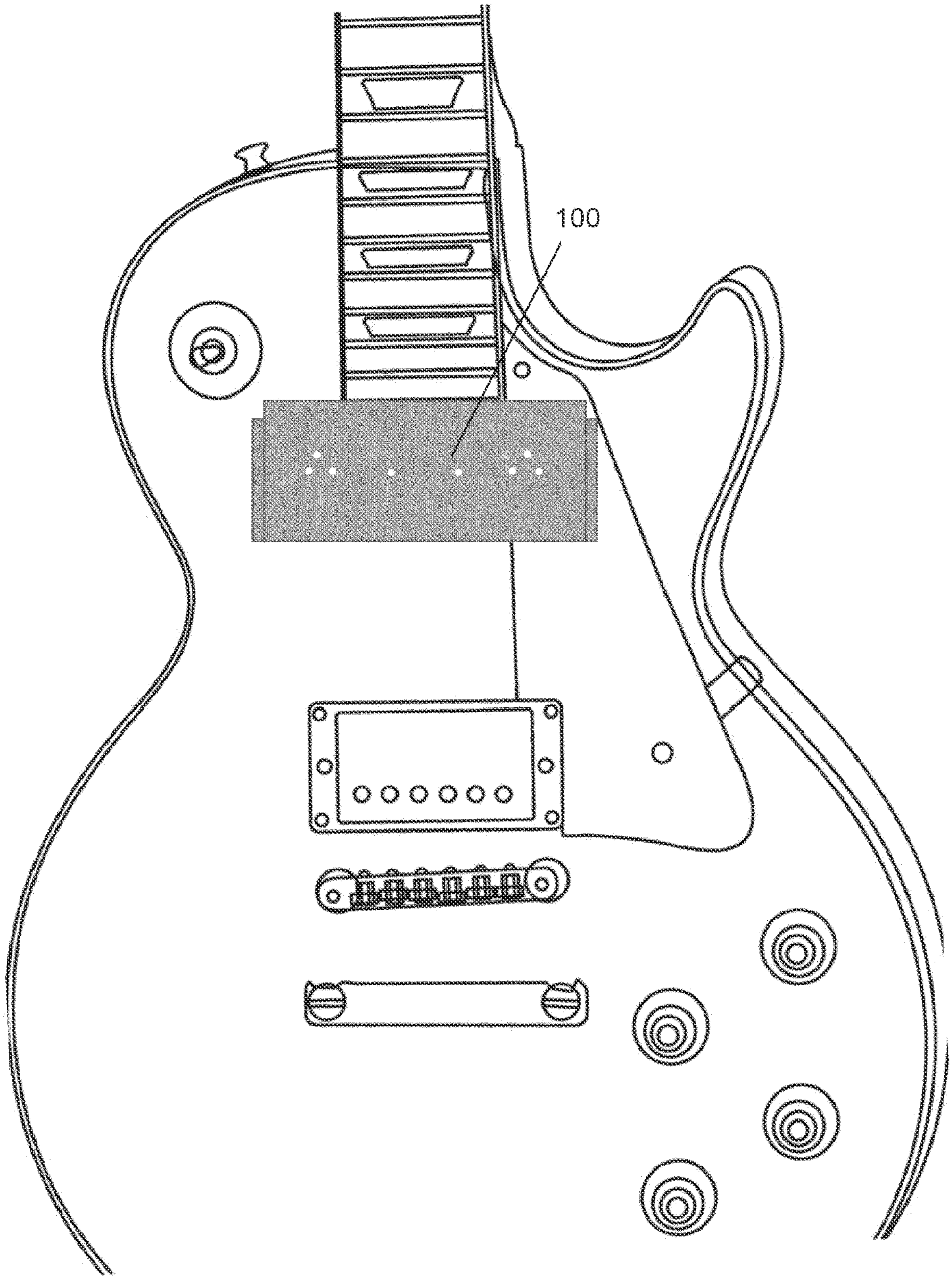
FIG. 23 shows a pickup holder according to the present disclosure installed on a guitar.

FIG. 23 illustrates the pickup holder 100 installed on the guitar, with the pickup holder 100 being engaged with the groove and lip 133 of the mount(s) 130, 140. The plurality of holes 107 in at least one face of the pickup holder 100 (typically the face that will, when mounted, be parallel to the face of the stringed instrument) can be seen. The holes 107 allow fastening means (e.g. screws) to be inserted through the holes to hold the pickup 118 in position within the cavity 106 of the pickup holder 100.

The pickup holder 100 therefore engages with an integrated mount 130 or a plurality (usually a pair) of individual mounts 140. Each of these may be sold separately, such that a person may purchase a particular pickup holder 100 to suit the particular pickup to be housed in the pickup holder and an integrated mount 130 or individual mounts 140 that are shaped to suit the particular stringed instrument with which the pickup holder 100 is to be used. Alternatively complete pickup holder systems may be sold, comprising the pickup holder 100 and mount(s) 130, 140.

As the pickup holder is relatively small, it is extremely portable which would enable users to put multiple pickup holders containing different pickups in their coat pocket for easy transportation, with one pickup holder on an instrument being swapped easily for another. The provision of an independent secondary audio output from the stringed instrument would also provide a backup in case any of the existing pickup, wiring, toggle switches, tone pots, volume pots or output jacks was faulty on the relevant stringed instrument.

The pickup holder 100 described mounts to a specific location on the stringed instrument, as defined by the mounts used. The pickup holder system described separates the pickup holder 100 from the mount(s) 130, 140 allowing for rapid detachment of the pickup holder 100 from the mount 130, 140.

The pickup holder system described allows for many different types of mounts to allow for use with the variable topologies of different string instruments.

The pickup holder system described may provide a completely distinct secondary audio output directly connected to an over-string pickup device, by means of the aperture 120 for mounting of an audio jack which in turn can be connected to the pickup, which avoids any electrical connection to any wiring on the stringed instrument.

The pickup holder system described may be secured either by a purpose-built pickup ring, pickup cover or pickguard or by non-harming, removable physical or chemical adherence such as van der Waals nanotape or tacky suction cups.

The pickup holder system described may be stationary and located directly above the strings thus avoiding any switches or pickup selectors.

The pickup holder system described provides support on both ends of the pickup device in the pickup holder, providing a stable installation with a fixed distance between the pickup device and the strings which results in a reliable output and tone.

The pickup holder system described has only two parts when used with a purpose-built pickup ring, pickup cover or pickguard and only three parts when used with the individual mounts. The simplification of design means that there are fewer parts, reducing the points of failure. In addition, the parts have been designed to facilitate 3D printing, injection moulding or other rapid and scalable manufacturing processes.

The pickup holder system described does not require bespoke methods or parts as the pickup is attached to the pickup holder in a similar way to the normal installation of Under-String Pickups.

In summary, the present disclosure relates to a rapidly detachable, replaceable and portable over-string pickup holder, particularly suitable for stringed instruments, comprising a detachable, replaceable and portable pickup holder and mounts that may be fitted to the stringed instrument in a way that does not alter or damage the structure of the stringed instrument, and that allows the pickup holder to be rapidly attached to and detached from the stringed instrument.

The portable pickup holder comprises a cavity that allows installation of all types of pickup using the same method by which such pickups are normally installed in their usual under-string locations on stringed instruments. For instance, the pickups are installed either (a) by inserting the pickup screws supplied by the relevant pickup manufacturer through the top of the pickup holder then through the pickup mounting springs supplied by the relevant pickup manufacturer and finally into the mounting screw holes in the pickup, or (b) by inserting standardised screws through the top of the pickup holder then through standardised pickup mounting springs then into a supplied adapter that allows for variable screw hole distances which in turn is connected to the pickup using the screws supplied by the relevant pickup manufacturer.

As with the normal installation of under-string pickups, this method of attachment to the pickup holder allows the user to adjust the height of each side of the pickup with respect to the height of the strings on the stringed instrument by varying the degree to which such screws are turned. In turn, this allows the user to adjust the output and tone of the relevant pickup in the same way as with the normal under-string installation.

The invention claimed is:

1. A pickup holder for use with a stringed musical instrument, comprising:

a housing, the housing comprising a cavity for receiving a pickup device within the housing, a first leg, a second leg, and a transverse portion connecting the first leg to the second leg, the first leg and the second leg being arranged to straddle strings of the stringed musical instrument;

engagement means for holding the pickup device in the cavity to form an over-string pickup, wherein the engagement means comprises a plurality of screws arranged for placement through apertures on the transverse portion of the housing so as to engage a corresponding plurality of threaded apertures on the pickup device, to thereby hold the pickup device in the cavity; and fastening means for attaching the pickup holder to at least one mount, the mount being engageable with the body of the stringed instrument; and a resilient bias means located between the transverse portion and a pickup device in the cavity.

2. The pickup holder of claim 1, wherein the housing is arranged such that a pickup device held by the engagement means in the cavity is located between strings of the stringed musical instrument and the housing when the pickup holder is attached to the at least one mount.

3. The pickup holder of claim 1, wherein:

the transverse portion is a transverse web;

the first leg is formed of a first portion extending from a first corner region of the transverse web, and a second portion extending from a second corner region of the transverse web, the first and second portions of the first leg being linked at an end distal from the transverse web by a first foot plate; and the second leg is formed of a first portion extending from a third corner region of the transverse web, and a second portion extending from a fourth corner region of the transverse web, the first and second portions of the second leg being linked at an end distal from the transverse web by a second foot plate.

4. The pickup holder of claim 3, wherein the fastening means comprises a protrusion located on the first foot plate arranged to engage a mount locater hole correspondingly formed in the mount such that, when the pickup holder is attached to the mount, an engagement of the protrusion and the mount locater hole arranged to prevent sliding motion of the housing with respect to the mount.

5. The pickup holder of claim 1, wherein the first leg, the second leg, and the transverse portion define the cavity.

6. The pickup holder of claim 1, wherein the fastening means comprises a stabilizing bar, the stabilizing bar comprising apertures arranged to pass through respective ones of the plurality of screws, the stabilizing bar having a length corresponding to an interior dimension of the cavity and arranged to be located between the transverse portion and a pickup device held in the cavity.

7. The pickup holder of claim 5, wherein:

the transverse portion is a transverse web;

the first leg is formed of a first portion extending from a first corner region of the transverse web, and a second portion extending from a second corner region of the transverse web, the first and second portions of the first leg being linked at an end distal from the transverse web by a first foot plate; and the second leg is formed of a first portion extending from a third corner region of the transverse web, and a second portion extending from a fourth corner region of the transverse web, the first and second portions of the second leg being linked at an end distal from the transverse web by a second foot plate.

8. The pickup holder of claim 3, wherein the fastening means comprises: a first aperture in the first leg, and a second aperture in the second leg, wherein at least one of the first and second apertures are arranged to engage a corresponding portion of the at least one mount.

9. The pickup holder of claim 8, wherein the mount comprises a pressure sensitive adhesive applied to an instrument facing side of the base plate.

10. The pickup holder of claim 8, further comprising:

a mount, engageable with the body of the stringed musical instrument, wherein the mount comprises:

a base plate for placing against a body of the stringed musical instrument;

a first upstanding portion extending away from the base plate; and a first flange extending from the first upstanding portion, the first flange defining a first lip having a size corresponding to the first aperture, wherein the housing is slidably engageable with the mount such that the first leg engages the first lip.

11. The pickup holder of claim 10, wherein the mount further comprises a second upstanding portion extending away from the base plate; and a second flange extending from the second upstanding portion the second flange defining a second lip having a size corresponding to the second aperture, the housing being slidably engageable with the mount such that the first leg and second leg engage the respective first and second lip.

12. The pickup holder of claim 11, wherein the first flange extends towards the second flange and the second flange extends towards the first flange, and wherein the first aperture is on a side of the first leg distal to the second leg, and the second aperture is on a side of the second leg distal from the first leg.

13. The pickup holder of claim 11, wherein the first aperture, the second aperture, the first lip, and, the second lip are formed such that, when the housing is engaged with the mount, an interference fit is formed.

14. The pickup holder of claim 11, wherein the base plate comprises a first base plate portion and a second base plate portion, wherein the first upstanding portion is located on the first base plate portion and the second upstanding portion is located on the second base plate portion.

15. The pickup holder of claim 10, wherein the first aperture is formed in the first portion of the first leg, and the second aperture is formed in the first portion of the second leg, and wherein, when the housing is slidably engaged with the mount, the second portion of the first leg and the second portion of the second leg abut the respective first and second lip, to provide a backstop to further sliding of the housing and mount with respect to each other.

16. The pickup holder of claim 1, wherein the fastening means comprises a stabilizing bar, the stabilizing bar comprising apertures arranged to pass through respective ones of a plurality of screws, the stabilizing bar having a length corresponding to an interior dimension of the cavity and arranged to be located between the transverse portion and a pickup device held in the cavity.

17. The pickup holder of claim 12, wherein the first aperture, second aperture, and first and second lips are formed such that when the housing is engaged with the mount an interference fit is formed.

18. A pickup holder for use with a stringed musical instrument, comprising:

a housing comprising a cavity for receiving a pickup device within the housing and a transverse portion;

engagement means for holding the pickup device in the cavity to form an over-string pickup, wherein the engagement means comprises a plurality of screws arranged to be placed through apertures on the transverse portion of the housing to engage a corresponding plurality of threaded apertures on the pickup device, to thereby hold the pickup device in the cavity; and fastening means for attaching the pickup holder to at least one mount, the mount being engageable with a body of the stringed musical instrument, wherein the fastening means comprises a stabilizing bar, the stabilizing bar comprising apertures arranged to pass through respective ones of the plurality of screws, the stabilizing bar having a length corresponding to an interior dimension of the cavity and arranged to be located between the transverse portion and a pickup device held in the cavity.

19. A pickup holder for use with a stringed musical instrument, comprising:

a housing comprising a cavity for receiving a pickup device within the housing, the housing further comprising a first leg, a second leg, and a transverse portion connecting the first leg and the second leg, the first leg and the second leg being arranged to straddle strings of the stringed musical instrument;

engagement means for holding the pickup device in the cavity to form an over-string pickup;

fastening means for attaching the pickup holder to at least one mount, the mount being engageable with a body of the stringed musical instrument; and a mount engageable with the body of the stringed musical instrument, wherein the mount comprises: a base plate for placing against a body of the stringed musical instrument; an upstanding portion extending away from the base plate; and a flange extending from the upstanding portion, the flange defining a lip having a size corresponding to an aperture of the first leg, wherein the housing is slidably engageable with the mount such that the first leg engages the lip.

20. A pickup holder for use with a stringed musical instrument, comprising:

a housing, the housing comprising a cavity for receiving a pickup device within the housing, a first leg, a second leg, and a transverse portion connecting the first leg and the second leg, wherein the first leg and the second leg are arranged to straddle strings of the stringed musical instrument, the traverse portion being a transverse web;

engagement means for holding the pickup device in the cavity to form an overstring pickup;

at least one mount engageable with a body of the stringed musical instrument, wherein the at least one mount is either: incorporable into fixings in the body of the stringed musical instrument; or individually affixable to the body of the stringed musical instrument using a pressure sensitive adhesive; and fastening means for attaching the pickup holder to the at least one mount, wherein the fastening means comprises a protrusion located on the first foot plate arranged to engage a corresponding mount locater hole correspondingly formed in the mount such that, when the pickup holder is attached to the mount, an engagement of the protrusion and the mount locater hole arranged to prevent sliding motion of the housing with respect to the mount, wherein:

the first leg is formed of a first portion extending from a first corner region of the transverse web, and a second portion extending from a second corner region of the transverse web, the first and second portions of the first leg being linked at an end distal from the transverse web by a first foot plate; and the second leg is formed of a first portion extending from a third corner region of the transverse web, and a second portion extending from a fourth corner region of the transverse web, the first and second portions of the second leg being linked at an end distal from the transverse web by a second foot plate.

* * * * *